UNITED STATES PATENT OFFICE.

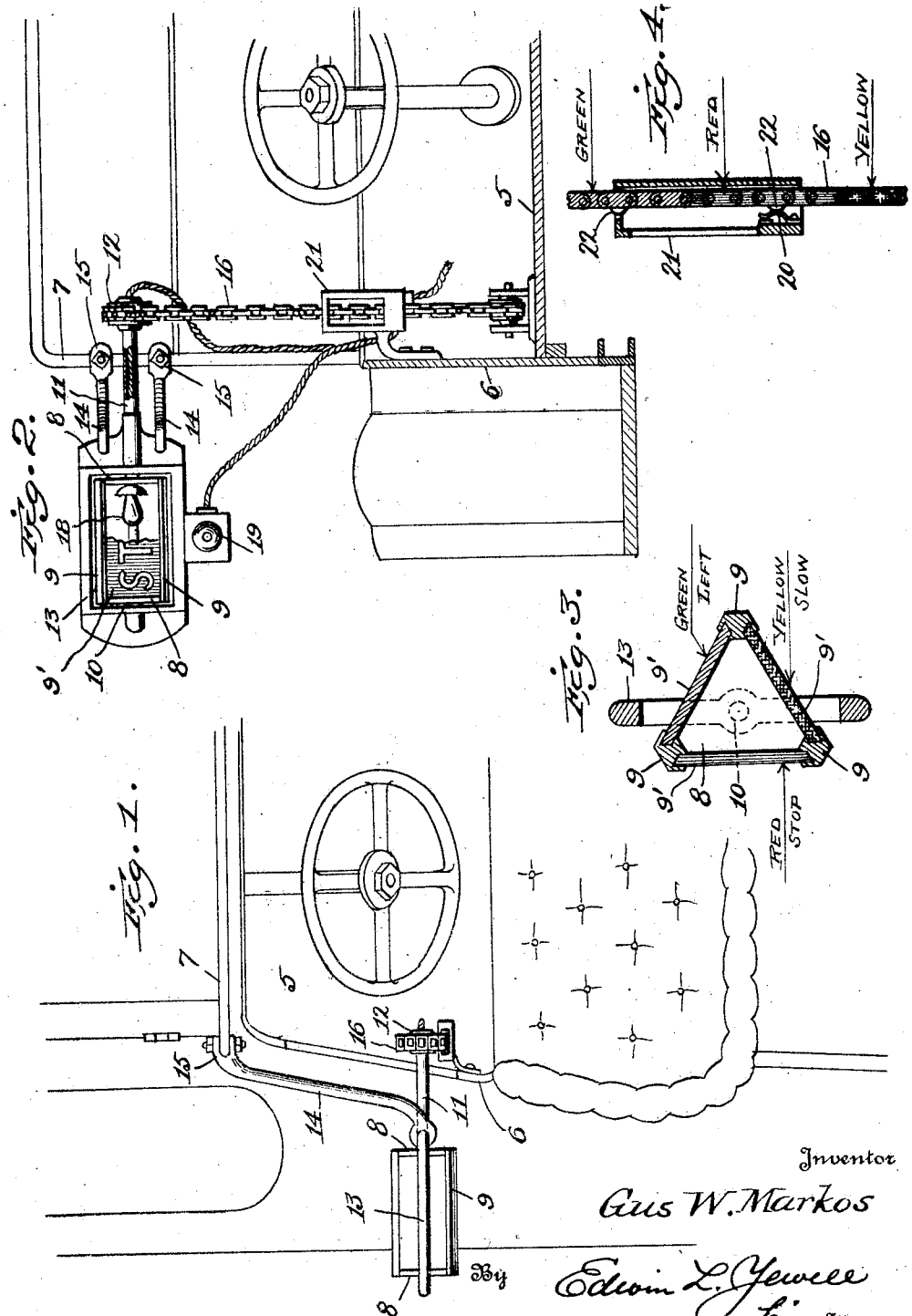

GUS W. MARKOS, OF COLUMBUS, OHIO.

VEHICLE DIRECTION-SIGNAL.

1,379,117.  Specification of Letters Patent.  Patented May 24, 1921.

Application filed August 23, 1920. Serial No. 405,305.

*To all whom it may concern:*

Be it known that I, GUS W. MARKOS, a subject of the King of Greece, residing at Columbus, in the county of Franklin and State of Ohio, U. S. A., have invented certain new and useful Improvements in Vehicle Direction-Signals, of which the following is a specification.

This invention relates to improvements in vehicle direction signals, and has for one of its objects to provide a device of this character which can be readily attached to existing machines without a great expense to the owner of the vehicle.

A further object is to provide a particularly formed supporting bracket for the signal means which can be attached to the wind-shield frame of an automobile and support the signal means at a point substantially opposite the operator's seat, to preclude the light from the signal shining in the operator's eyes.

A still further object is to provide an operating means for a direction signal constructed to indicate to the operator when a certain color is properly positioned as a signal.

These and other objects are attained by the means illustrated in the accompanying drawing, in which:—

Figure 1 is a plan view of a portion of an automobile showing the improved signal in position.

Fig. 2 is a vertical cross section of the part of the automobile shown in Fig. 1 looking forwardly.

Fig. 3 is a detail sectional view through the signal box and its supporting frame, and Fig. 4 is a detail sectional view through the guide-bracket for the operating chain.

Similar reference numerals in all of the figures of the drawing, designate like parts.

In the construction shown, 5 designates the floor of the vehicle, 6 one of the side walls, and 7 the wind-shield frame.

The signal box has preferably three sides and is formed with end-plates 8 connected together by glass-plate-holding beads 9, the glass-plate 9' being of different colors, such as red, green and yellow, and preferably provided with certain words, such as "Stop," "Left" and "Slow" respectively, formed in white letters. The outside end-plate 8 is provided with a trunnion 10, and the inside end-plate is preferably connected to a hollow shaft 11, on the end of which is attached a sprocket-wheel 12 for a purpose hereinafter described.

Trunnion 10 and the hollow shaft 11 are journaled in frame 13 which is secured to a pair of supporting arms 14, each having a suitable clamping means 15 at their free ends by which they can be detachably secured to a vertical portion of the wind-shield frame. These supporting arms 14 extend substantially at right angles to the axis of the signal box and parallel with the side of the car, and are of sufficient length to reach from the wind-shield to near the front edge of the seat of the car, so that the signal box will be supported almost opposite to the position occupied by the operator of the car. In this position the glare of light from the signal box will not shine in the eyes of the operator.

Hollow shaft 11 is sufficiently long to extend from the signal box, supported outside of the car body, to a point within the side wall 6, so that the sprocket-wheel 12, or its operating-chain 16, is within easy reach of the operator. Operating-chain 16 is prevented from swinging by a pulley 17 secured to the floor of the car. It will thus be seen that by operating this chain 16, the hollow shaft and signal box will be rotated to present a desired signal. A lamp 18 is supported in the signal box in any desirable manner and its circuit wires are extended through the hollow shaft.

With the rear face of the signal box in position opposite the position of the operator, it is desirable to provide an indicating means to inform the operator when a particular signal is in its proper signaling position. To accomplish this, sections of the operating-chain are preferably painted different colors corresponding to the colors of the signal-plates, as shown in Fig. 4 of the drawing. By this means, the operator by watching the chain when he is adjusting the signals, and noticing when a certain color on the chain reaches a certain point, he will know without looking at the signal box that the desired signal is exposed.

As a further precaution, to notify the operator when a signal is properly positioned, means are provided to sound an alarm when the signal is correctly positioned. This alarm means is preferably a bell 19 suitably secured to the signal box frame and provided with an electrical connection to a normally open contact switch 20 mounted upon a suitable chain-guide 21 fixed to the side of the car, and said switch is closed by button 22 fixed to the chain, one for each colored section of the chain. Thus when the operator moves the chain until the bell rings, at that time he will know that one of the signal-plates is correctly positioned, and at the same time the lamp 18 will be lighted.

Having thus fully described the invention, what is claimed is:—

1. A vehicle direction signal, comprising a signal box having signals on its respective sides, an open frame for supporting said signal box and in which it is mounted to rotate, supporting arms for said frame having short ends and fastening means for attaching them to the frame of the windshield and formed with a long arm arranged substantially at right-angle to said short ends and adapted to extend backwardly therefrom to support the signal box and its frame at a point outside of and adjacent the seat of the car, and operating means for rotating said signal box.

2. A vehicle direction signal, comprising a signal box having signals on its respective sides, an open frame for supporting said signal box and in which it is mounted to rotate, supporting arms for said frame having short ends and fastening means for attaching them to the frame of the windshield and formed with a long arm arranged substantially at right-angle to said short ends and adapted to extend backwardly therefrom to support the signal box and its frame at a point outside of and adjacent the seat of the car, and operating means for rotating said signal box, said operating means being provided with colored sections to correspond to the colors of the signal box to determine when a desired signal is exposed to signaling position.

3. A vehicle direction signal, comprising a signal box having signals on its respective sides, an open frame for supporting said signal box and in which it is mounted to rotate, supporting arms for said frame having short ends and fastening means for attaching them to the frame of the windshield and formed with a long arm arranged substantially at right-angle to said short ends and adapted to extend backwardly therefrom to support the signal box and its frame at a point outside of and adjacent the seat of the car, and a belt operating means for rotating said signal box, said belt operating means embodying a belt having sections colored to correspond to the colors of the signal box to determine when a desired signal is exposed to signaling position.

4. A vehicle direction signal, comprising a signal box having signals on its respective sides, an open frame for supporting said signal box and in which it is mounted to rotate, supporting arms for said frame having short ends and fastening means for attaching them to the frame of the windshield and formed with a long arm arranged substantially at right-angle to said short ends and adapted to extend backwardly therefrom to support the signal box and its frame at a point outside of and adjacent the seat of the car, and operating means for rotating said signal box, said operating means being provided with colored sections to correspond to the colors of the signal box to determine when a desired signal is exposed to signaling position, and an audible signal means controlled by said operating means for the signal box.

In testimony whereof I affix my signature.

GUS W. MARKOS.